United States Patent [19]

Fuchs et al.

[11] 4,074,967
[45] Feb. 21, 1978

[54] DYESTUFF PREPARATIONS FOR DYEING AND PRINTING NATURAL AND SYNTHETIC POLYAMIDE FIBRE MATERIALS

[75] Inventors: Hermann Fuchs, Kelkheim, Taunus; Gustav Kapaun, Neuenhain, Taunus; Fritz Meininger, Frankfurt am Main, all of Germany

[73] Assignee: Hoechst Aktiengesellschaft, Frankfurt am Main, Germany

[21] Appl. No.: 526,389

[22] Filed: Nov. 22, 1974

[30] Foreign Application Priority Data

Nov. 24, 1973 Germany .............................. 2358586

[51] Int. Cl.² .................... C09B 11/00; D06P 3/24
[52] U.S. Cl. ...................................... 8/54; 8/168 B; 8/169; 8/172 R; 8/173; 8/178 R
[58] Field of Search ................. 8/173, 169, 54, 168, 8/172, 178 R

[56] References Cited

U.S. PATENT DOCUMENTS

| 2,032,033 | 2/1936 | Wolff | 8/54 |
| 3,706,524 | 12/1972 | Flensberg | 8/21 A |

FOREIGN PATENT DOCUMENTS

| 883,703 | 10/1971 | Canada. |
| 2,152,752 | 4/1973 | France. |
| 771,270 | 10/1934 | France. |
| 1,544,463 | 8/1969 | Germany. |
| 1,816,000 | 8/1969 | Germany. |
| 516,629 | 1/1972 | Switzerland. |
| 1,054,746 | 1/1967 | United Kingdom. |

OTHER PUBLICATIONS

Diserens—Chemical Technology of Dyeing & Printing (vol. 2) (Reinhold) (N.Y.) (1951) pp. 366–367.
Bird–Theory & Practice of Wool Dyeing (3rd ed.) (Soc. Dyers & Colourists) (Yorkshire, England) (1963) pp. 177–179.
Hockh–Chem. Dictionary (3rd ed.) (McGraw-Hill) (N.Y.) (1944) p. 431.
Moncrieff–Man-Made Fibres (5th ed.) (Wiley) (N.Y.) (1970) p. 45.
Colour Index (3rd ed.) (vol. 4) (Soc. Dyers & Colourists) (Yorkshire, England) (1971) p. 4414.

*Primary Examiner*—Melvyn I. Marquis
*Assistant Examiner*—H. H. Fletcher
*Attorney, Agent, or Firm*—Curtis, Morris & Safford

[57] ABSTRACT

A highly water-soluble composition for the dyeing or printing of native or synthetic polyamide fibres consisting essentially of (a) 10 to 99 parts by weight of at least one dyestuff

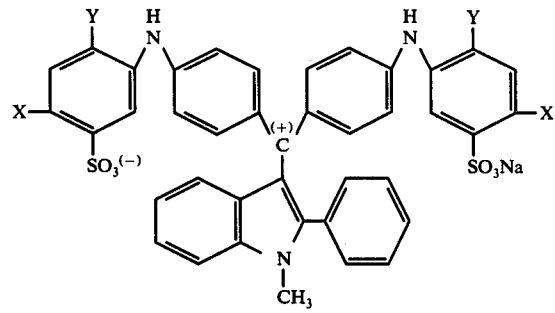

in which X represents hydroxy, methyl, ethyl, methoxy or ethoxy, and Y represents hydrogen or methyl, and (b) 0.5 to 90 parts by weight of an auxiliary agent of the group consisting of a polyglycol of an average molecular weight from 3000 to 20 000, a polyglycolether (containing 15 to 30 ether groups) of a fatty alcohol of 8 to 20 carbon atoms, an alkali metal salt of a dialkylnaphthalene sulfonic acid (alkyl $C_1$–$C_6$), a methyltauride of a saturated or unsatruated fatty acid of 8 to 20 carbon atoms, and an isethionate of a saturated or unsaturated fatty acid of 8 to 20 cabron atoms, and mixtures thereof, said composition being also suitable for the dyeing or printing of the said polyamide fibres in deep shades.

1 Claim, No Drawings

DYESTUFF PREPARATIONS FOR DYEING AND PRINTING NATURAL AND SYNTHETIC POLYAMIDE FIBRE MATERIALS

The present invention relates to highly water-soluble dyestuff preparations for the dyeing or printing of natural and synthetic poly-amide fibre materials, having a content of 10 to 99 parts by weight of at least one dyestuff of the general formula

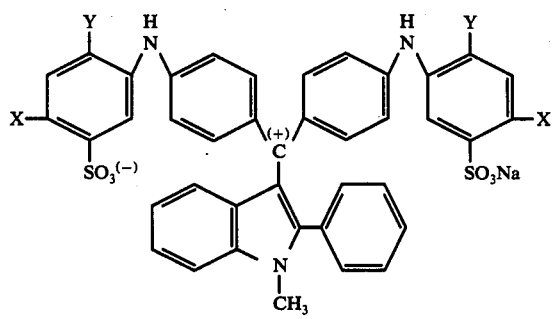

wherein X represents a hydroxy, methyl, ethyl, methoxy or ethoxy group, and Y represents a hydrogen atom or the methyl group, 0.5 to 90 parts by weight, preferably 0.5 to 15 percent by weight of a higher molecular organic auxiliary of the series of polyglycols having an average molecular weight of 3000 to 20 000, polyglycol ethers of fatty alcohols or fatty acid amides containing hydroxyl groups with 8 to 20 carbon atoms having 15 to 30 ether groups, alkylbenzene-phenyl-ether disulfonates (alkyl $C_1 - C_6$), dialkylnaphthalene-sulfonates (alkyl $C_1 - C_6$) and methyl taurides or isethionates of saturated or unsaturated fatty acids having 8 to 20 carbon atoms.

The above-mentioned higher molecular organic auxiliaries, which cause an increased solubility of the dyestuffs, can be used independently from one another or preferably in combination with one another.

There may also be added water-soluble compounds which have practically no influence on the solubility of the dyestuff, as extenders, anti-dusting agents or as anti-foaming agents.

As compared with preparations which do not contain the above-mentioned higher molecular organic auxiliaries, the preparations of the invention are much better soluble in water or in aqueous dyeing liquors, padding liquors or printing pastes and are, therefore, suitable for dyeing and printing synthetic and natural polyamide fibre materials, such as for example wool, silk or leather, whereby also in deep shades even, intense blue dyeings or prints free from dots are obtained. Especially in the case of printing pastes a good solubility is the first condition for their use, since rather a large amount of dyestuff, i.e. up to 70 parts of dyestuff in 1000 parts of a printing paste has to be incorporated into the relatively small volume of the printing paste besides the thickener and other reactants.

It must be considered surprising that the dyestuff preparations of the invention are also suitable for printing and dyeing the mentioned polyamide fibre materials in deep shades, since the dyestuffs having the structure usual during the preparation process, cause considerable difficulties for dissolution during dyeing and printing in the case of shades of medium intensity.

Among the polyglycols and polyglycol ethers of fatty alcohols or fatty acid amides containing hydroxyl groups which serve to increase the solubility of the dyestuffs, the following substances may be mentioned for example: coconut oil alcohol polyglycol ether, stearyl alcohol polyglycol ether, oleyl alcohol-polyglycol ether, or oxethylated coconut oil acid monoethanol amide, to each of which 25 mols of ethylene oxide per mol of fatty alcohol or fatty acid amide are added.

Other classes of auxiliaries already mentioned above and used for the same purpose are for example dodecyl-benzene-phenyl ether disulfonate, dibutyl-naphthalene-sulfonate, oleic acid methyl tauride and oleic acid isethionate.

Besides these additives non-ionic extenders, such as dextrine, cane sugar or urea, which have practically no influence or only a slight influence on solubility, may be present. As defoaming agent may be added for example tri-n-butyl phosphate and as dust-binding agent for example a mineral oil emulsion.

The additives mentioned may be added in very different ways. Thus, the dyestuff and the additives may be finely ground in a mixing drum and in the usual dry crushing devices, as for example in a ball mill or pinned disc mill. Another possibility consists in spraying low-melting additives in a molten state onto the finely ground powder. The additives may also be added to the moist filter good obtained in usual way, of the organic dyestuff, or, if desired, to the aqueous dyestuff solution, from which dyestuff powder may be obtained by spray drying or dr drying.

The parts indicated in the following Examples are by weight. If the dyestuffs are used with a content of pure colors below 100%, for example 95%, the residual content generally consists of alkali metal halides or alkali metal sulfonates resulting from the manufacturing process.

The following Examples illustrate the invention.

EXAMPLE 1 a. 48.75 Parts of the dyestuff of the formula

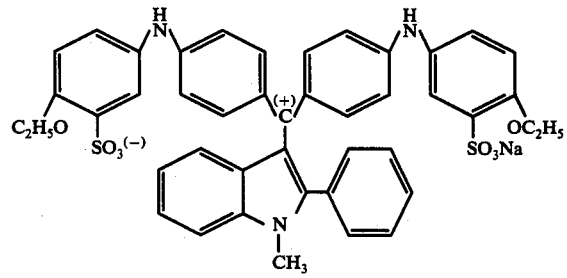

having a content of pure color of 95% were introduced into 1000 ml of boiling water. After stirring for 10 minutes the solution was filtered. 20 g of dyestuff remained undissolved.

b. 975 Parts of the dyestuff mentioned above under (a) and having a content of pure color of 95% were ground with 20 parts of coconut oil alcohol polyglycol ether, to which 25 mols of ethylene oxide per mol of fatty alcohol were added, and with 5 parts of an anti-dusting agent containing mineral oil in a pinned disc mill.

50 Parts of this dyestuff preparation were introduced into 1000 parts of boiling water. After stirring for ten minutes the solution was filtered. The solution of the dyestuff preparation did not leave any ponderable residue on the filter.

c. From the dyestuff preparation mentioned above under (b) a printing paste was prepared according to the following prescription:

| | |
|---|---|
| 30 | Parts of the dyestuff preparation mentioned above |
| 50 | Parts of thio-urea |
| 500 | Parts of a crystal gum thickening |
| 30 | Parts of glycol ether |
| 10 | Parts of sodium chlorate |
| 20 | Parts of ammonium sulfate |
| 360 | Parts of water |
| 1000 | Parts of printing paste. |

When using this printing ink deep blue prints free from dots were obtained on native or synthetic polyamide fibre materials. It is not possible to obtain with the dyestuff mentioned having a content of pure colors of 95% in an unfinished from suitable printing pastes having the same dyestuff content: 15 parts of dyestuff at the most having the above-mentioned additives may be processed to give a suitable printing paste free from dots.

The same result is obtained if instead of the above-mentioned coconut oil alcohol polyglycol ether the same amount of stearyl alcohol polyglycol ether containing 15 ether groups, or oleyl alcohol polyglycol ethers containing 30 ether groups, were used and the operation was continued as described above.

EXAMPLE 2

195 Parts of the dyestuff of the formula

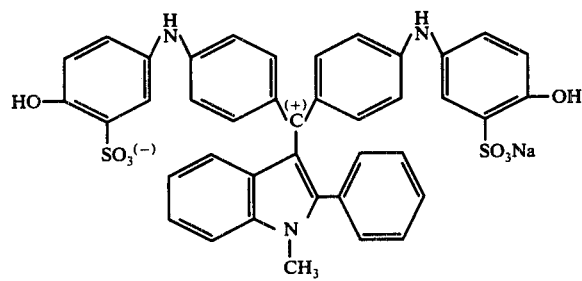

having a content of pure color of 95 % were ground in a pinned disc mill with 710 parts of dextrine, 80 parts of sodium salt of the dibutyl-naphthalene-sulfonic acid, 10 parts of coconut oil alcohol polyglycol ether, which contained in an additive manner 25 mols of ethylene oxide per mol of fatty alcohol, and 5 parts of an anti-dusting agent containing mineral oil. With this dyestuff preparation clear intense blue dyeings and prints were obtained on wool and synthetic polyamide fibres. The solubility of the dyestuff preparation in boiling water was 100 g/l, whereas the solubility of the dyestuff having a content of pure color of 95% (manufactured good) was only 40 g/l, calculated on a comparable color strength.

EXAMPLE 3

900 Parts of the dyestuff mentioned in Example 1 having a content of pure color of 95% were ground with 95 parts of oleic acid methyl tauride and 5 parts of an anti-dusting agent containing mineral oil, in a pinned disc mill.

55 Parts of this dyestuff preparation were introduced into 1000 parts of boiling water. After stirring for ten minutes the solution was filtered. The solution of the dyestuff preparation did not leave any ponderable residue on the filter.

If instead of oleic acid methyl tauride the coconut fatty acid methyl tauride or the sodium salt of the oleic acid isethionate or the sodium salt of the coconut fatty acid isethionate were added in the same amount, dyestuff preparations having the same good solubility in water were obtained.

EXAMPLE 4

965 Parts of the dyestuff mentioned in Example 1 having a content of pure color of 95% were ground in a pinned disc mill with 30 parts of polyglycol having an average molecular weight of 3000 and 5 parts of an anti-dusting agent containing mineral oil.

50 Parts of this dyestuff preparation were introduced into 1000 parts of boiling water. After stirring for ten minutes the solution was filtered. The solution of the dyestuff preparation did not leave any ponderable residue on the filter. If instead of 30 parts of polyglycol having the average molecular weight of 3000, 30 parts of polyglycol having the average molecular weight of 20,000 were used, a dyestuff preparation was obtained which had the same properties with regard to solubility.

We claim:

1. A highly water-soluble composition for the dyeing or printing of native or synthetic polyamide fibres essentially of (a) 10 to 99 parts by weight of at least one dyestuff of the formula

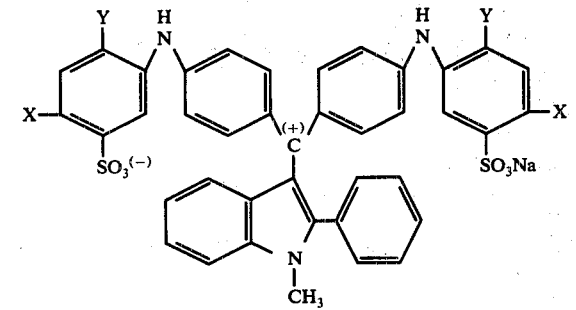

in which X represents hydroxy, methyl, ethyl, methoxy or ethoxy, and Y represents hydrogen or methyl, and (b) 0.5 to 90 parts by weight of an auxiliary agent of the group consisting of a polyglycol of an average molecular weight from 3000 to 20,000, a polyglycolether (containing 15 to 30 ether groups) of a fatty alcohol of 8 to 20 carbon atoms, an alkali metal salt of a dialkylnaphthalene sulfonic acid (alkyl $C_1 - C_6$), a methyltauride of a saturated or unsaturated fatty acid of 8 to 20 carbon atoms, and an isethionate of a saturated or unsaturated fatty acid of 8 to 20 carbon atoms, and mixtures thereof.

* * * * *